(12) United States Patent
Huang et al.

(10) Patent No.: US 8,529,864 B2
(45) Date of Patent: Sep. 10, 2013

(54) PROCESS FOR HYDROGEN PRODUCTION

(75) Inventors: Yuh-Jeen Huang, Hsinchu (TW);
Chuin-Tih Yeh, Hsinchu (TW);
Tsui-Wei Wang, Hsinchu (TW);
Liang-Chor Chung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/218,794

(22) Filed: Aug. 26, 2011

(65) Prior Publication Data
US 2011/0311440 A1 Dec. 22, 2011

Related U.S. Application Data

(63) Continuation-in-part of application No. 12/394,950, filed on Feb. 27, 2009, now abandoned.

(30) Foreign Application Priority Data

Sep. 26, 2008 (TW) .............................. 97137058 A

(51) Int. Cl.
*C01B 3/22* (2006.01)

(52) U.S. Cl.
USPC ..................................................... 423/648.1

(58) Field of Classification Search
USPC ..................................................... 423/648.1
See application file for complete search history.

(56) References Cited

U.S. PATENT DOCUMENTS

| | | | |
|---|---|---|---|
| 4,789,540 A | 12/1988 | Jenkins | |
| 6,576,217 B1 | 6/2003 | Nojima et al. | |
| 6,919,066 B2 | 7/2005 | Holzle et al. | |
| 6,926,880 B2 | 8/2005 | Holzle et al. | |
| 7,255,848 B2 | 8/2007 | Deluga et al. | |
| 7,998,456 B2 * | 8/2011 | Van Dijk et al. | ........... 423/648.1 |
| 2001/0016188 A1 | 8/2001 | Haga et al. | |
| 2002/0193248 A1 | 12/2002 | Holzle et al. | |
| 2003/0216255 A1 | 11/2003 | Murcia Mascaros et al. | |
| 2005/0002858 A1 | 1/2005 | Suzuki et al. | |
| 2007/0172416 A1 | 7/2007 | Kawashima et al. | |
| 2007/0269367 A1 | 11/2007 | Wolf | |

OTHER PUBLICATIONS

M.L. Cubeiro, et al., "Partial Oxidation of Methanol Over Supported Palladium Catalysts", Applied Catalysis A: General 168 (1998) 307-322.
T. Bunluesin, et al., "CO Oxidation for the Characterization of Reducibility in Oxygen Storage Components of Three-Way Automotive Catalysts", Applied Catalysis B: Environment 14 (1997) 105-115.
Zhifei Wang, et al., "Selective Production of Hydrogen by Partial Oxidation of Methanol Over Cu/Cr Catalysts", Journal of Molecular Catalysis A: Chemical 191 (2003) 123-134.
S. Schuyten, et al., "Selective Combinatorial Studies on Ce and Zr Promoted Cu/Zn/Pd Catalysts for Hydrogen Production Via Methanol Oxidative Reforming", Catalysis Letters, vol. 106, Nos. 1-2, Jan. 2006.
S. Velu, et al.,"Selective Production of Hydrogen by Partial Oxidation of Methanol Over Catalysts Derived from CuZnAl-layered Double Hydroxides", Catalysis Letters 62 (1999) 159-167.

\* cited by examiner

*Primary Examiner* — Wayne Langel
(74) *Attorney, Agent, or Firm* — Muncy, Geissler, Olds & Lowe, PLLC

(57) ABSTRACT

A process for hydrogen production at lower temperature by using Mn/ZnO, Cu/MnO, Cu/CeO$_2$, CuCe/ZnO and/or CuMn/ZnO catalysts, wherein a partial oxidization of methanol (POM) process can be initiated at an ambient reactor temperature lower than 100° C. and then undertaken at a reaction temperature lower than 200° C., and wherein POM process not only generates hydrogen rich gas (HRG) containing 4% CO or less but also generates 1.8 moles hydrogen or more per 1 mole methanol consumed.

14 Claims, 1 Drawing Sheet

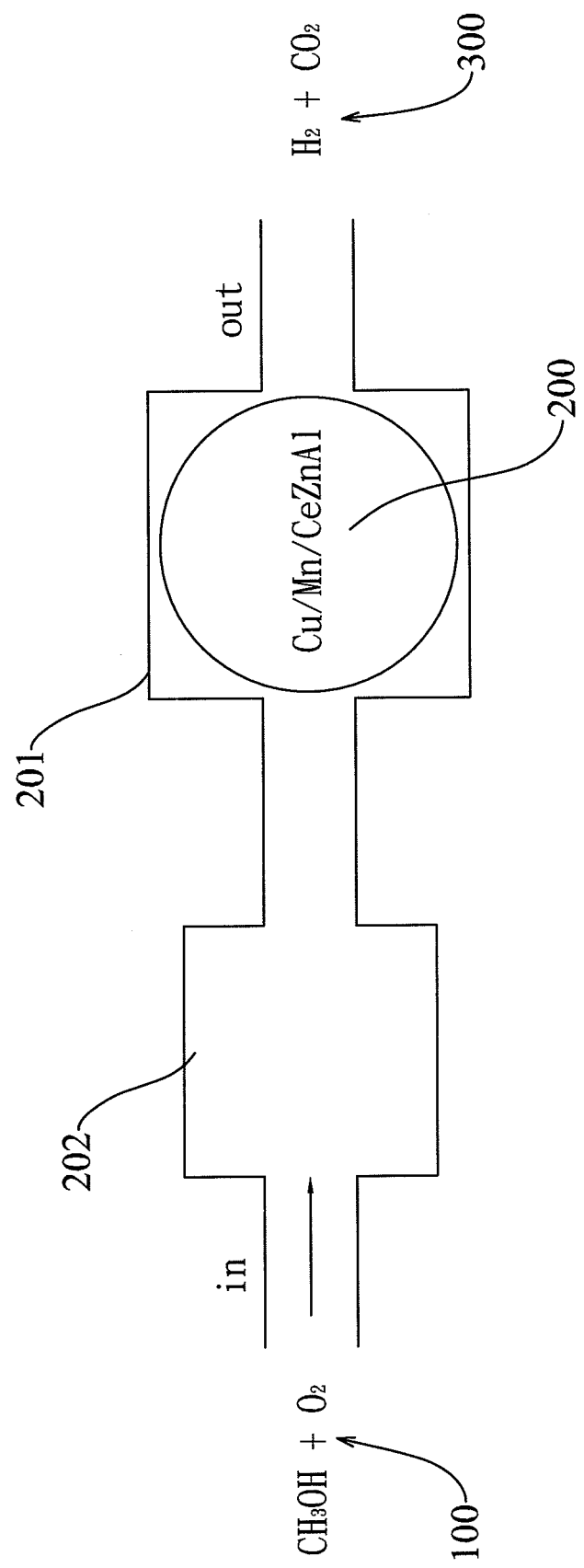

PROCESS FOR HYDROGEN PRODUCTION

RELATED APPLICATIONS

This application is a Continuation-In-Part Patent application of Ser. No. 12/394,950 filed on Feb. 27, 2009 now abandoned.

BACKGROUND OF THE INVENTION

1. Field of the Invention

The present invention relates to a hydrogen production process, more particularly to a hydrogen production process initiated at a lower ambient reactor temperature and producing hydrogen at a lower reaction temperature.

2. Description of the Related Art

Fuel cells capable of converting chemical energy of the fuel into electricity and also satisfying the requirement of environmental protection are now being continuously developed. Proton exchange membrane fuel cells (PEMFCs) take advantage of lower operation temperature and are of great potential among those developing fuel cells. However, PEMFCs have disadvantages in storage and transportation of hydrogen. Hydrocarbon molecules are used as the external primary fuel in PEMFCs and converted into hydrogen rich gas (HRG) on site. HRG is gas mixture with high hydrogen content and one of environmentally friendly fuels applied in fuel cells.

Production of HRG from reforming of methanol has been widely studied because of being highly chemically active, abundant, and cheap. Many methanol reforming processes have been developed and published in literatures, including (1) "methanol decomposition" (MD) process, (2) "steam reforming of methanol" (SRM) process and (3) "partial oxidation of methanol" (POM) process, which may be expressed by the following chemical formulas.

$$CH_3OH \rightarrow 2H_2 + CO \quad \Delta H = 90.1 \text{ kJmol}^{-1} \quad (1)$$

$$CH_3OH + H_2O \rightarrow 3H_2 + CO_2 \quad \Delta H = 49 \text{ kJmol}^{-1} \quad (2)$$

$$CH_3OH + \tfrac{1}{2}O_2 \rightarrow 2H_2 + CO_2 \quad \Delta H = -192 \text{ kJ mol}^{-1} \quad (3)$$

CO is not only one main product generated in the MD process but also a contaminant for the platinum electrodes of the fuel cells. SRM process has high hydrogen yield (number of hydrogen molecule produced per each methanol molecule consumed) of $R_{H2} = 3.0$. However, SRM process is an endothermic reaction which is not theoretically favored at low temperatures according to Le Chatelier's Principle and tends to be efficient at high temperature (>250° C.).

POM process is another known process for hydrogen production process in literatures. Different from SRM process, the POM process is an exothermic reaction. Once reaching the initiation temperature, the POM process will persist autonomously without external heat energy. Therefore, the POM process consumes less energy and requires a smaller reactor and a lower cost.

There have been many researches about catalysts for the POM process. For example, catalysts containing Cu, Zn, Ce, Zr, and Pd are disclosed in a US patent of publication No. 20070269367 by Wolf et al. The aforementioned catalysts need a higher temperature (>200° C.) to attain a better catalytic activity for the POM reaction. Further, a carbon monoxide (CO) selection ratio for the aforementioned reaction is as high as about 10%, and high CO content in the HRG will poison the platinum catalyst in PEMFCs, abruptly impair the catalytic function and thus lower the performance of PEMFCs. The performances of POM catalysts adopted in the following papers are listed in Table.1, including Pd/ZnO (M. L. Cubeiro, J. L. G. Fierro, Appl. Catal. A 168 (1998) 307), Cu/ZnO (T. Bunluesin, R. J. Gorte, G. W. Graham, Appl. Catal. B 14 (1997) 105), Cu/ZnO—$Al_2O_3$ (S. Velu, K. Suzuki, T. Osaki, Catal. Lett. 62 (1999) 159, US patent of publication No. 20050002858), Cu/Cr-ZnO (Z. F. Wang, J. Y. Xi, W. P. Wang, G X. Lu, J. Mol. Catal. A: Chemical 191 (2003) 123), and CuPd/$ZrO_2$—ZnO (S. Schuyten, E. E. Wolf., Catal. Lett. 106 (2006) 7, US patent of publication No. 20070269367).

TABLE 1

Effects of Catalysts on the POM Reaction

| Catalyst | Reaction Temperature (° C.) | $C_{MeOH}$ (%) | $S_{H2}$ (%) | $S_{CO}$ (%) |
|---|---|---|---|---|
| Pd/ZnO | 250 | 70 | 96 | 19 |
| Cu/ZnO | 320 | 78 | 98 | 10 |
| Cu/ZnO—$Al_2O_3$ | 245 | 83 | 98 | 12 |
| Cu/Cr—ZnO | 200 | 86 | 68 | 12 |
| CuPd/$ZrO_2$—ZnO | 200 | 89 | 88 | 11 |

According to Table.1, these catalysts share a common drawback in catalytic effect on the POM reaction that they could only have good catalytic activity in conditions of higher temperature (>220° C.).

Nojima et al (U.S. Pat. No. 6,576,217) and Wolf (US Patent Application 20070269367) both disclose that cerium oxide is a useful component for catalysts for the partial oxidation of methanol. However, none of Nojima and Wolf has disclosed a POM process at a lower initiation temperature (<100° C.) and reaction temperature (<200° C.).

As all the Cu and Pd containing catalysts in the cited papers need a reaction temperature over 200° C., the POM process needs a step of pre-heating and start-up, which is likely a bottleneck for initiation time. PEMFCs and reduces the practicability of PEMFCs. Once the initiation temperature and reaction temperature of the POM process are lowered, the start-up time of PEMFC, electric vehicles and electronic products would be shortened. Furthermore, the power consumption and cost thereof would also be reduced.

SUMMARY OF THE INVENTION

One objective of the present invention is to provide a process for hydrogen production at a lower temperature, wherein a partial oxidization of methanol (POM) process can be initiated at an ambient reactor temperature lower than 100° C. and then undertaken at a reaction temperature lower than 200° C., and wherein the POM process not only generates hydrogen rich gas (HRG) containing 4% CO or less but also generates 1.8 moles hydrogen or more per 1 mole methanol consumed.

Another objective of the present invention is to provide a process for hydrogen production at a lower temperature and use a low-cost Cu and/or ZnO-based catalyst to produce a low-CO HRG for fuel cells, wherein the low-CO HRG causes less contamination to the platinum electrodes of the fuel cells.

A further objective of the present invention is to provide a process for hydrogen production at a lower temperature, wherein a Cu and/or ZnO-based catalyst is used to catalyze and initiate the POM process at an ambient reactor temperature, and then the temperature is raised by the POM process.

To achieve the abovementioned objectives, one embodiment of the present invention proposes a process for hydrogen production at a lower temperature, which comprises steps of:

providing a gas mixture comprising methanol and oxygen; conducting the gas mixture to flow through a catalyst at an ambient temperature lower than 100° C., wherein the catalyst is a member selected from the group consisting of Mn/ZnO, Cu/MnO, Cu/CeO$_2$, CuCe/ZnO and CuMn/ZnO catalysts; catalyzing and initiating a partial oxidation of methanol (POM) process, wherein the POM process supplies heat energy itself; and generating a hydrogen rich gas (HRG) at a reaction temperature less than or equal to 200° C., wherein the HRG contains less than or equal to 4 vol. % CO, and the POM process generates 1.8 moles hydrogen or more per 1 mole methanol consumed.

BRIEF DESCRIPTION OF THE DRAWINGS

FIGURE is a diagram schematically illustrating a POM process according to one embodiment of the present invention.

DETAILED DESCRIPTION OF THE INVENTION

A catalyst is a substance capable of reducing reaction temperatures of processes and controlling the selectivity ratio for products; therefore, a good catalyst allows a lower reaction temperature for a process. Finding an appropriate catalyst has been an important task in chemical process development. A process for hydrogen production at a lower temperature of the present invention adopts a Cu and/or ZnO-based catalyst, which is low-cost and has high oxidizing/reducing capability. Further, the non-combustion type catalyst of the present invention can lower the reaction temperature of the POM process.

Method for Catalyst Preparation

Mn/ZnO, Cu/MnO, Cu/CeO$_2$, CuCe/ZnO, CuMn/ZnO and CuMn/ZnOAl catalysts adopted in the present invention are prepared with a co-precipitation method. In one embodiment, a 2M sodium bicarbonate (NaHCO$_3$) aqueous solution is added into an aqueous solution containing mixture of copper nitrate (Cu(NO$_3$)$_2$), cerium nitrate(Ce(NO$_3$)$_4$), aluminum nitrate (Al(NO$_3$)$_3$) and zinc nitrate(Zn(NO$_3$)$_2$), and the precipitation pH value is controlled within 6-9 to form a blue-green precipitate. The precipitate is then calcined at a temperature of 400° C. to obtain a fresh Cu/Mn$_x$O-z, Cu/Ce$_x$O$_2$-z, Cu/Mn$_x$Al$_y$ZnO-z or Cu/Ce$_x$ZnO-z catalyst, wherein x is the weight percentage of manganese oxide or cerium oxide, y is the weight percentage of aluminum oxide, and z is the precipitation pH value of the mixed aqueous solution. The prepared Cu and/or ZnO-based catalyst contains 5-50 wt % copper according to the abovementioned co-precipitation method.

POM Process and Method for Testing Catalytic Reaction

Refer to Figure for a POM system according to the present invention. In a fixed bed reactor 201, a 0.1 g reduced catalyst 200 (60~80 mesh) is placed in a quartz tube (not shown in the drawing) with a 4 mm inner diameter in which the catalyst is immobilized with silica wool.

With regard to reactants 100, an aqueous methanol is evaporated with a pre-heater at a flow rate controlled by a liquid pump. Each flow rate of oxygen and carrier gas (e.g. Ar) is respectively controlled by a flow mass controller. The oxygen, Ar, and the gas evaporated from the aqueous methanol are charged into a mixing chamber 202 and mixed homogeneously (6.1 vol. % O$_2$, 12.2 vol. % CH$_3$OH, 81.7 vol. % Ar; $n_{O2}/n_{meOH}$=0.5) to obtain a mixture. The gas mixture is then conducted to flow through the catalyst bed in the reactor 201. Here, the oxygen may be provided with pure oxygen or air. The gas mixture containing methanol and oxygen flows through the Cu and/or ZnO-based catalyst catalyzing the POM reaction at the ambient reactor temperature lower than 100° C. After the reaction is initiated, the temperature of the gas mixture will be autoheated to over 120° C. within 2 minutes without external heat energy supplied. Hydrogen is then generated by the POM reaction at a temperature lower than 200° C.

The reaction products 300 are subjected to a qualitative separation process via two GC (gas chromatography), in which the H$_2$ and CO are separated by a Molecular Sieve 5A chromatography column, and H$_2$O, CO$_2$, and CH$_3$OH are separated by a Porapak Q chromatography column. A quantitative analysis is carried out by a TCD (thermal conductivity detector).

After the quantitative analysis via the TCD, a methanol conversion rate ($C_{meOH}$), selectivity of hydrogen ($S_{H2}$) and CO selectivity ($S_{CO}$) are calculated as follows:

$$C_{MeOH} = (n_{MeOH,in} - n_{MeOH,out})/n_{MeOH,in} \times 100\%$$

$$S_{H2} = n_{H2}/(n_{H2} + n_{H2O}) \times 100\%$$

$$S_{CO} = n_{CO}/(n_{CO2} + n_{CO}) \times 100\%$$

A higher $c_{MeOH}$ in the POM process represents the higher amount of reacted methanol in the whole process. The hydrogen may be generated from the POM process as well as oxidized with the oxygen in the reacting gases; therefore, a higher $S_{H2}$ represents less hydrogen oxidized and less water generated after the POM reaction. A higher $S_{CO}$ represents that the carbon in the methanol is more likely desorbed in the form of CO after the methanol is dehydrogenated; that is to say a less selectivity of CO$_2$.

The Following are the effects of catalysts containing Cu/MnZnO, Cu/MnZnAl and Cu/CeZnO on the POM reaction.

Effect of Manganese Oxide Content

Table.2 shows the effect of manganese oxide content in Cu/MnO and Cu/MnZnOA 1 catalysts in the POM reaction. Although a catalyst containing only manganese oxide (Mn$_{20}$ZnO) has less catalytic activity, and a catalyst containing only copper (30% Cu/ZnO) is unable to initiate the POM reaction at the reactor temperature equal to 90° C., catalysts with the presence of both can initiate the reaction at a reactor temperature, and heat the system to reach a temperature over 120° C. within 2 minutes.

TABLE 2

Effect of Manganese Oxide Content in Cu/MnZnO and Cu/MnZnOAl Catalysts on the POM Reaction

| Catalyst | Initiation Temperature (° C.) | Reaction Temperature (° C.) | $C_{MeOH}$ (%) | $S_{H2}$ (%) | $S_{CO}$ (%) |
|---|---|---|---|---|---|
| Mn$_{20}$ZnO | 90 | 180 | 70 | 74 | 8 |
| 30% Cu/ZnO | 140 | 180 | 90 | 88 | 8 |
| 30% Cu/MnO | 90 | 180 | 74 | 68 | 11 |
| 30% Cu/Mn$_{10}$ZnO | 90 | 180 | 94 | 85 | 9 |
| 30% Cu/Mn$_{20}$ZnO | 90 | 180 | 97 | 80 | 8.6 |
| 30% Cu/Mn$_{10}$ZnOAl$_{10}$ | 90 | 180 | 95 | 81 | 8 |
| 30% Cu/Mn$_{20}$ZnOAl$_{20}$ | 90 | 180 | 87 | 87 | 10 |

Meanwhile, the hydrogen could be generated at a temperature less than or equal to 180° C. The higher the manganese oxide content, the better catalyst activity and lower $S_{CO}$ will be at lower temperature. However, $S_{H2}$ slightly decreases with the increasing manganese oxide since redundant manganese oxide makes the generated hydrogen more likely to react with oxygen. Thus, the appropriate manganese oxide content is between 10 and 70 wt %. According to Table.2, redundant aluminum oxide content results in lower catalytic activity of catalysts containing aluminum oxide. Thus, the appropriate aluminum oxide content is between 10 and 30 wt %.

Effect of Cerium Oxide Content

Table.3 shows the effect of cerium oxide content in Cu/CeZnO catalysts on the POM reaction. According to Table.3, the initiation temperature decreases with the increasing cerium oxide content. Especially, when the cerium oxide content is over 40 wt %, the reaction can be initiated at a reactor temperature equal to 90° C., and the temperature of the POM process will reach 120° C. and over within two minutes. However, $S_{H2}$ and $C_{meOH}$ slightly decrease with the increase of cerium oxide because redundant cerium oxide content (70 wt %) makes hydrogen more likely to react with oxygen. Thus, the appropriate cerium oxide content is between 40 and 70 wt %.

TABLE 3

Effect of Cerium Oxide Content in Cu/CeZnO Catalyst on the POM Reaction

| Catalyst | Initiation Temperature (° C.) | Reaction Temperature (° C.) | $C_{MeOH}$ (%) | $S_{H2}$ (%) | $S_{CO}$ (%) |
|---|---|---|---|---|---|
| 30% Cu/ZnO-7 | 200 | 225 | 95 | 91 | 13 |
| 30% Cu/Ce$_{20}$ZnO-7 | 180 | 200 | 97 | 92 | 11 |
| 30% Cu/Ce$_{40}$ZnO-7 | 90 | 180 | 95 | 90 | 13 |
| 30% Cu/CeO$_2$-7 | 90 | 180 | 93 | 86 | 18 |
| 30% Cu/Ce$_{40}$ZnO-7 | 90 | 120 | 86 | 89 | 8 |
| 30% Cu/CeO$_2$-7 | 90 | 120 | 82 | 84 | 9 |

Effect of Copper Content

Table.4 shows the effect of copper content in Cu/CeZnO catalysts on the POM reaction. Cu/CeZnO catalysts with about 30 wt % copper content have shown the greatest catalytic activity due to larger surface area of metal copper. Thus, the appropriate copper content is between 20 and 40 wt %.

TABLE 4

Effect of Copper Content in Cu/CeZnO Catalysts on the POM Reaction

| Catalyst | Reaction Temperature (° C.) | $C_{MeOH}$ (%) | $S_{H2}$ (%) | $S_{CO}$ (%) |
|---|---|---|---|---|
| 10% Cu/Ce$_{40}$ZnO-7 | 200 | 81 | 84 | 6 |
| 30% Cu/Ce$_{40}$ZnO-7 | 200 | 97 | 90 | 14 |
| 50% Cu/Ce$_{40}$ZnO-7 | 200 | 71 | 85 | 4 |

Effect of Precipitation pH Value

Table.5 shows the effect of precipitation pH value for the sodium bicarbonate-precipitated Cu/CeZnO catalyst on the POM reaction. According to Table.5, the Cu/CeZnO catalysts have the greatest catalytic activity at a precipitation pH value of 6-7. The catalytic activity of the Cu/CeZnO catalyst decreases as the precipitation pH value rises since a higher pH value converts blue carbonate precipitate into black precipitate of copper oxide and hence increases the size of copper particles. Thus, the appropriate precipitation pH value is between 6 and 9.

TABLE 5

Effect of pH Value for Sodium Bicarbonate-Precipitated Cu/CeZnO Catalyst on the POM Reaction

| Catalyst | Reaction Temperature (° C.) | $C_{MeOH}$ (%) | $S_{H2}$ (%) | $S_{CO}$ (%) |
|---|---|---|---|---|
| 30% Cu/Ce$_{40}$ZnO-6 | 200 | 95 | 90 | 13 |
| 30% Cu/Ce$_{40}$ZnO-7 | 200 | 97 | 90 | 14 |
| 30% Cu/Ce$_{40}$ZnO-9 | 200 | 86 | 89 | 10 |

From the above description, the exemplary Cu/MnZnO catalysts or Cu/CeZnO catalysts play an important role in initiating the POM reaction at a reactor temperature and producing hydrogen at a lower temperature. The POM reaction can be initiated at a reactor temperature lower than 100° C. by adopting the above-mentioned catalysts, and the POM reaction can heat up to reach a temperature over 120° C. The POM reaction then generates HRG with low-CO contamination and high hydrogen-yield at a temperature lower than 200° C., wherein the CO concentration is less than or equal to 4 vol. %. The present invention may cause impact on the development of petroleum industry, fuel cell technology, and hydrogen economic since PEMFCs (Proton Exchange Membrane Fuel Cell) have now been regarded as a very potential power source for notebook computers, mobile phones and digital cameras. The POM process catalyzed by catalysts of this present invention is of high hydrogen yield and may be applied to PEMFC.

In conclusion, the present invention proposes a process for hydrogen production at low temperature, which comprises the following steps: providing a gas mixture with a methanol/oxygen molar ratio less than or equal to 0.6; and conducting the gas mixture to flow through a Cu/ZnO-based catalyst and initiating the POM reaction at a reactor temperature, wherein the gas mixture reaches a temperature over 120° C. within 2 minutes, and the POM reaction then generates HRG at a reaction temperature lower than 180° C., and wherein the HRG contains less than 4 vol. % of CO, and the POM reaction can generate 1.8 moles hydrogen or more per 1 mole of methanol consumed, and wherein the Cu/ZnO-based catalyst contains copper, cerium oxide, manganese oxide, zinc oxide, aluminum oxide, etc.

The process for hydrogen production of the present invention adopts a Cu or ZnO-based catalyst, which contains at least one of cerium oxide and manganese oxide. Preferably, the CuMn/ZnOAl catalyst of the present invention contains 20.0-40.0 wt % copper, 10.0-70.0 wt % manganese oxide, 10.0-50.0 wt % aluminum oxide, and the CuCe/ZnO catalyst or Cu/CeO$_2$ catalyst contains 20.0-40.0 wt % copper and 40.0-70.0 wt % cerium oxide.

The embodiments described above are to demonstrate the technical thoughts and characteristics of the present invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:
1. A process for hydrogen production comprising
providing a gas mixture comprising methanol and oxygen;
conducting the gas mixture to flow through a catalyst at an ambient temperature lower than 100° C. so as to catalyze and initiate a partial oxidation of methanol (POM) process wherein the catalyst is a member selected from the group consisting of Mn/ZnO, Cu/MnO and CuMn/ZnO catalysts and further wherein the POM process supplies heat energy itself; and generating a hydrogen rich gas (HRG) from said POM process at a reaction temperature less than or equal to 200° C., wherein the HRG contains less than or equal to 4 vol. % CO, and the POM process generates 1.8 moles hydrogen or more per 1 mole methanol consumed.

2. The process for hydrogen production according to claim 1, wherein no external heat is required for initiating the POM process.

3. The process for hydrogen production according to claim 1, wherein the oxygen is provided with pure oxygen or air.

4. The process for hydrogen production according to claim 1, wherein the gas mixture has a methanol/oxygen molar ratio less than or equal to about 0.6.

5. The process for hydrogen production according to claim 1, wherein the catalyst is a CuMn/ZnO catalyst.

6. The process for hydrogen production according to claim 5, wherein the CuMn/ZnO catalyst contains 20.0-40.0 wt % copper.

7. The process for hydrogen production according to claim 5, wherein the CuMn/ZnO catalyst contains 10.0-70.0 wt % manganese oxide.

8. The process for hydrogen production according to claim 6, wherein the CuMn/ZnO catalyst further contains 10.0-50.0 wt % aluminum oxide.

9. The process for hydrogen production according to claim 1, wherein the catalyst is prepared with a co-precipitation method.

10. The process for hydrogen production according to claim 9, wherein an aqueous solution of sodium bicarbonate ($NaHCO_3$) is applied as a precipitation agent during co-precipitation.

11. The process for hydrogen production according to claim 9, wherein the co-precipitation method is processed at a precipitation pH value within 6-9.

12. The process for hydrogen production according to claim 1, wherein the ambient temperature is less than or equal to 90° C.

13. The process for hydrogen production according to claim 1, wherein the reaction temperature is less than or equal to 180° C.

14. The process for hydrogen production according to claim 1, wherein the catalyst is a member selected from the group consisting of Mn/ZnO and Cu/MnO catalysts.

* * * * *